(12) United States Patent
Kim et al.

(10) Patent No.: US 9,191,172 B2
(45) Date of Patent: Nov. 17, 2015

(54) METHOD WHEREIN A BASE STATION TRANSMITS AND RECEIVES TDD CONFIGURATION INFORMATION REGARDING A PLURALITY OF CCS IN A WIRELESS COMMUNICATION SYSTEM SUPPORTING A PLURALITY OF THE CCS, AND APPARATUS FOR SAME

(75) Inventors: Dongcheol Kim, Anyang-si (KR); Hangyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 126 days.

(21) Appl. No.: 14/007,616

(22) PCT Filed: Mar. 23, 2012

(86) PCT No.: PCT/KR2012/002144
§ 371 (c)(1),
(2), (4) Date: Sep. 25, 2013

(87) PCT Pub. No.: WO2012/134120
PCT Pub. Date: Oct. 4, 2012

(65) Prior Publication Data
US 2014/0016520 A1    Jan. 16, 2014

Related U.S. Application Data

(60) Provisional application No. 61/467,397, filed on Mar. 25, 2011.

(51) Int. Cl.
*H04L 5/00* (2006.01)
*H04L 5/14* (2006.01)

(52) U.S. Cl.
CPC ............. *H04L 5/0053* (2013.01); *H04L 5/001* (2013.01); *H04L 5/0048* (2013.01); *H04L 5/1469* (2013.01)

(58) Field of Classification Search
None
See application file for complete search history.

(56) References Cited

U.S. PATENT DOCUMENTS 5,912,586 A * 6/1999 Mitzlaff .................... 330/149
8,599,686 B2 * 12/2013 Jung et al. .................. 370/230

(Continued)

FOREIGN PATENT DOCUMENTS

KR    10-2009-0069119    6/2009
KR    10-2010-0073992    7/2010

(Continued)

OTHER PUBLICATIONS

PCT International Application No. PCT/KR2012/002144, Written Opinion of the International Searching Authority dated Oct. 8, 2012, 21 pages.

(Continued)

*Primary Examiner* — Bunjob Jaroenchonwanit
(74) *Attorney, Agent, or Firm* — Lee, Hong, Degerman, Kang & Waimey

(57) ABSTRACT

The method of transmitting a TDD (time division duplex) configuration information on a plurality of component carriers (CC) by a base station in a wireless communication system supporting a plurality of the CCs according to the present invention includes determining at least one first CC index to be configured with an uplink-downlink configuration, which is identical with a uplink-downlink configuration of at least one CC configured to a different base station, among a plurality of the CCs configured to the base station; and configuring a CC corresponding to a frequency band of the determined at least one first CC index among a plurality of CCs configured to at least one user equipment with the uplink-downlink configuration, wherein the CC corresponding to the determined at least one first CC index is a CC configured to an identical frequency band between the base station and the different base station.

10 Claims, 10 Drawing Sheets

(56) References Cited

U.S. PATENT DOCUMENTS

| | | |
|---|---|---|
| 8,767,649 B2 * | 7/2014 | Kwon et al. .................. 370/329 |
| 8,837,416 B2 * | 9/2014 | Ng ................................ 370/329 |
| 2005/0135508 A1 * | 6/2005 | Kim et al. ..................... 375/326 |
| 2010/0272051 A1 * | 10/2010 | Fu et al. ........................ 370/329 |
| 2010/0279624 A1 * | 11/2010 | Esteve Asensio et al. . 455/67.13 |
| 2011/0216678 A1 * | 9/2011 | Krishnamoorthi et al. ... 370/310 |
| 2011/0235620 A1 * | 9/2011 | Ahn et al. ..................... 370/336 |
| 2011/0243039 A1 * | 10/2011 | Papasakellariou et al. ... 370/280 |
| 2011/0281601 A1 * | 11/2011 | Ahn et al. ..................... 455/500 |
| 2012/0087317 A1 * | 4/2012 | Bostrom et al. ............. 370/329 |
| 2012/0099545 A1 * | 4/2012 | Han et al. ..................... 370/329 |
| 2012/0281654 A1 * | 11/2012 | Aiba et al. .................... 370/329 |
| 2012/0307757 A1 * | 12/2012 | Edler Von Elbwart et al. ............................ 370/329 |
| 2014/0321386 A1 * | 10/2014 | Fu ................................. 370/329 |

FOREIGN PATENT DOCUMENTS

| | | |
|---|---|---|
| KR | 10-2010-0116118 | 10/2010 |
| WO | 2010/051752 | 5/2010 |
| WO | 2010/099735 | 9/2010 |

OTHER PUBLICATIONS

Catt, et al., "Consideration on Component Carrier Index," 3GPP TSG RAN WG2 Meeting #69bis, R2-102060, Apr. 2010, 4 pages.

European Patent Office Application Serial No. 12765816.9, Search Report dated Aug. 13, 2014, 8 pages.

* cited by examiner

FIG. 3
Prior Art
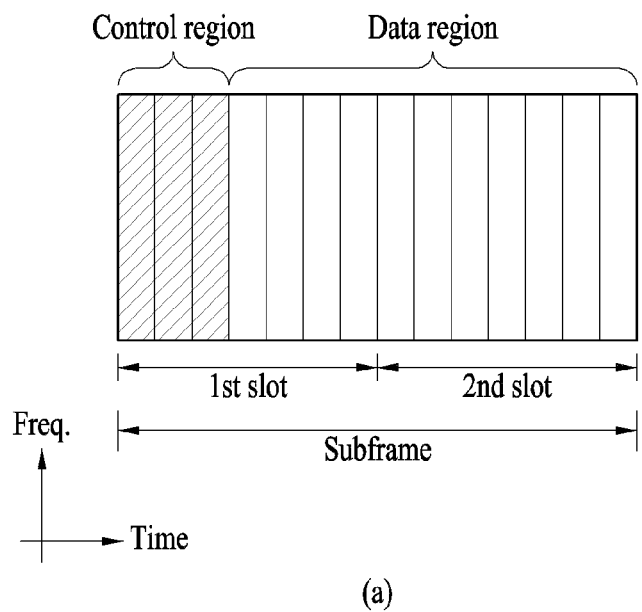
(a)
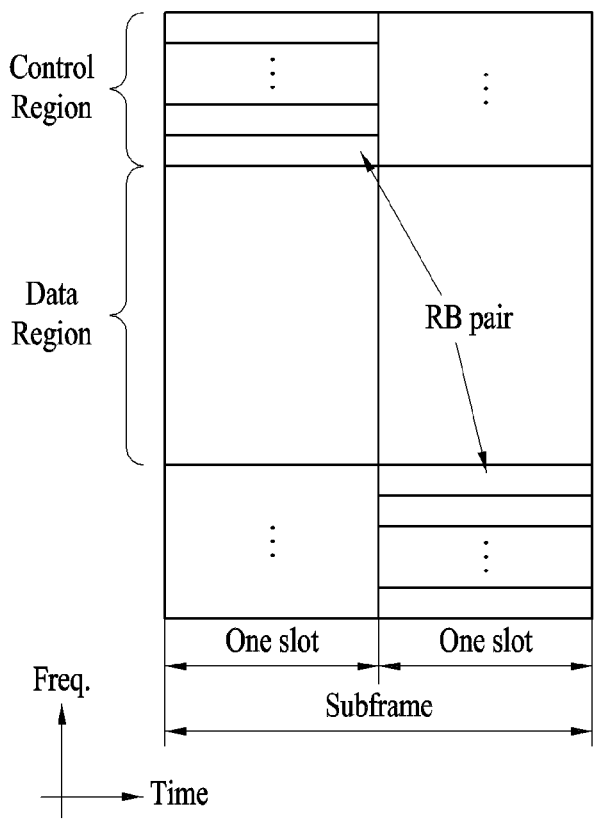
(b)

FIG. 5
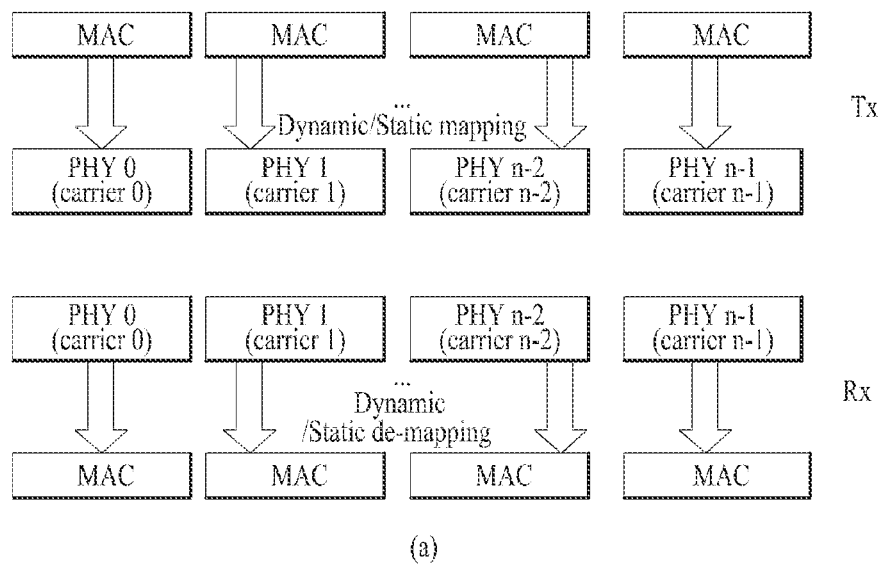
(a)
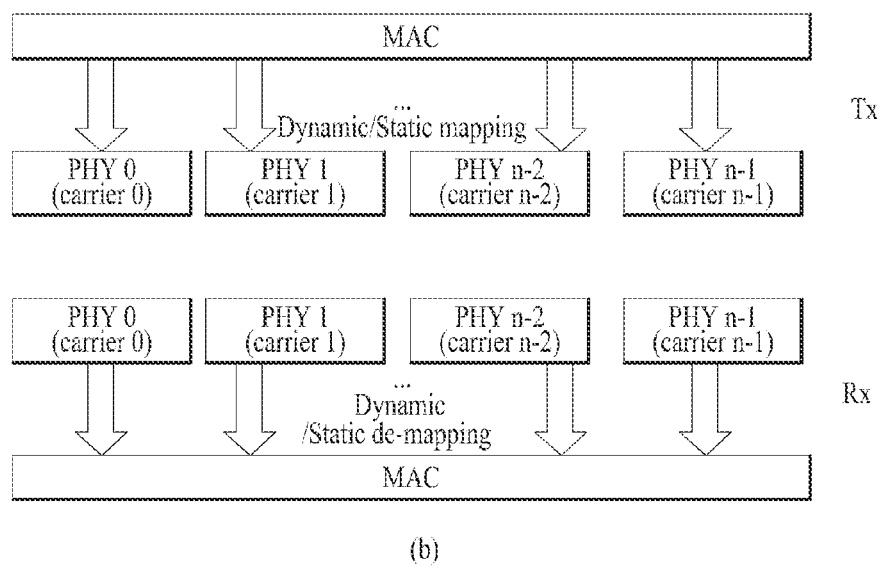
(b)

METHOD WHEREIN A BASE STATION TRANSMITS AND RECEIVES TDD CONFIGURATION INFORMATION REGARDING A PLURALITY OF CCS IN A WIRELESS COMMUNICATION SYSTEM SUPPORTING A PLURALITY OF THE CCS, AND APPARATUS FOR SAME

CROSS-REFERENCE TO RELATED APPLICATIONS

This application is the National Stage filing under 35 U.S.C. 371 of International Application No. PCT/KR2012/002144, filed on Mar. 23, 2012, which claims the benefit of U.S. Provisional Application Ser. No. 61/467,397, filed on Mar. 25, 2011, the contents of which are all hereby incorporated by reference herein in their entirety.

TECHNICAL FIELD

The present invention relates to a radio communication, and more particularly, to a method of transmitting/receiving TDD configuration information on a plurality of component carriers, which is transmitted/received by a base station in a wireless communication system supporting a plurality of the component carriers and apparatus therefor.

BACKGROUND ART

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP ($3^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE.

DISCLOSURE OF THE INVENTION

Technical Tasks

One object of the present invention is to provide a method of transmitting TDD configuration information on a plurality of CCs, which is transmitted by a base station in a wireless communication system supporting a plurality of the CCs.

Another object of the present invention is to provide a method of receiving TDD configuration information on a plurality of CCs, which is received by a base station in a wireless communication system supporting a plurality of the CCs.

Another object of the present invention is to provide a base station device capable of transmitting TDD configuration information on a plurality of CCs in a wireless communication system supporting a plurality of the CCs.

Another object of the present invention is to provide a user equipment device capable of receiving TDD configuration information on a plurality of CCs in a wireless communication system supporting a plurality of the CCs.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve the aforementioned technical task and in accordance with the purpose of the invention, as embodied and broadly described herein, according to the present invention, a method of transmitting a TDD (time division duplex) configuration information on a plurality of component carriers (CC) by a base station in a wireless communication system supporting a plurality of the CCs includes determining at least one first CC index to be configured with an uplink-downlink configuration, which is identical with a uplink-downlink configuration of at least one CC configured to a different base station, among a plurality of the CCs configured to the base station and configuring a CC corresponding to a frequency band of the determined at least one first CC index among a plurality of CCs configured to at least one user equipment with the uplink-downlink configuration, wherein the CC corresponding to the determined at least one first CC index is a CC configured to an identical frequency band between the base station and the different base station. The method may further include the step of transmitting information including the at least one first CC index configured with the identical uplink-downlink configuration to the at least one user equipment, respectively.

The identical uplink-downlink configuration may be identical to a downlink subframe, a position or number of a special frame and an uplink subframe, or a ratio of the downlink subframe and the uplink subframe in a pre-defined plurality of uplink-downlink configurations. At least one CC index of a CC configured to a specific user equipment among the at least one user equipment, which corresponds to a frequency band of the determined at least one first CC index of the base station, may be different from each other. At least one between the determined at least one first CC index of the base station and CC index configured to the at least one user equipment, which corresponds to the frequency band of the determined at least one first CC index of the base station, may be different from each other.

The CC, which corresponds to the at least one first CC index configured with the uplink-downlink configuration identical to the uplink-downlink configuration of the base station, among a plurality of the CCs configured to the at least one user equipment can include a primary cell (Pcell). The CC, which corresponds to the at least one first CC index configured with the uplink-downlink configuration identical to the uplink-downlink configuration of the base station, among a plurality of the CCs configured to the at least one user equipment can include a secondary cell (Scell).

The method may further include transmitting control information to the at least one user equipment on CC corresponding to the frequency band of the CC corresponding to the determined at least one first CC index among a plurality of the CCs configured to the at least one user equipment, respectively.

If a Pcell is not configured to the CC corresponding to the at least one first CC index configured with the uplink-downlink configuration identical to the uplink-downlink configuration of the base station among a plurality of the CCs configured to the at least one user equipment, the method may further include transmitting control information to the at least one user equipment on the CC configured as the Pcell among the CC corresponding to the at least one first index or the CC configured to the at least one user equipment, respectively. If the control information is transmitted to the at least one user equipment on the CC configured as the Pcell, respectively, the control information can be transmitted in a manner of being included in a data channel with a piggyback type.

To further achieve the aforementioned different technical task and in accordance with the purpose of the invention, as embodied and broadly described herein, according to one embodiment of the present invention, a method of receiving a TDD (time division duplex) configuration information on a plurality of component carriers (CC by a user equipment in a wireless communication system supporting a plurality of the CCs includes receiving an information including at least one first CC index configured with an identical uplink-downlink configuration between a base station and the user equipment among a plurality of the CCs, wherein the identical uplink-downlink configuration is configured for a CC corresponding to a frequency band of the CC corresponding to the determined at least one first CC index among a plurality of the CCs configured to the user equipment, wherein the at least one first CC index corresponds to a CC index configured with a uplink-downlink configuration identical to a uplink-downlink configuration configured to at least one CC of a different base station, and wherein the at least one CC of the different base station configured with the uplink-downlink configuration identical to the uplink-downlink configuration configured to the CC corresponding to the at least one first CC index may correspond to the CC configured on the frequency band.

The method may further include receiving control information from the base station on the CC corresponding to the frequency band of the CC corresponding to the determined at least one first CC index among a plurality of the CCs configured to the user equipment.

The CC, which corresponds to the at least one first CC index configured with the uplink-downlink configuration identical to the uplink-downlink configuration configured to the base station, among a plurality of the CCs configured to the user equipment can include a secondary cell (Scell). If a primary cell (Pcell) is not configured to the CC corresponding to the at least one first CC index configured with the uplink-downlink configuration identical to the uplink-downlink configuration configured to the base station among a plurality of the CCs configured to the user equipment, the method can further include the step of receiving a control information from the base station on the CC configured as the Pcell among the CC corresponding to the at least one first CC index or the CC configured to the user equipment. If the control information is received on the CC configured as the Pcell, the control information can be received in a manner of being included in a data channel with a piggyback type.

To further achieve the aforementioned different technical task and in accordance with the purpose of the invention, as embodied and broadly described herein, according to one embodiment of the present invention, a base station for transmitting a TDD (time division duplex) configuration information on a plurality of component carriers (CC) in a wireless communication system supporting a plurality of the CCs, the base station comprises a processor configured to determine at least one first CC index to be configured with an uplink-downlink configuration, which is identical with a uplink-downlink configuration of at least one CC configured to a different base station, among a plurality of the CCs configured to the base station, the processor configured to configure a CC corresponding to a frequency band of the determined at least one first CC index among a plurality of CCs configured to at least one user equipment with the uplink-downlink configuration, wherein the CC corresponding to the determined at least one first CC index is a CC configured to an identical frequency band between the base station and the different base station.

The base station may further include a transmitter configured to transmit information including the at least one first CC index configured with the identical uplink-downlink configuration to the at least one user equipment, respectively.

The base station may further include the transmitter configured to transmit a control information to the at least one user equipment on the CC corresponding to the frequency band identical to the CC corresponding to the determined at least one first CC index among a plurality of the CCs configured to the at least one user equipment, respectively.

If a Pcell is not configured to the CC corresponding to the at least one first CC index configured with the uplink-downlink configuration identical to the uplink-downlink configuration of the base station among a plurality of the CCs configured to the at least one user equipment, the base station may further include the transmitter configured to transmit control information to the at least one user equipment on the CC configured as the Pcell among the CC corresponding to the at least one first index or the CC configured to the at least one user equipment, respectively. In this case, if the control information is transmitted to the at least one user equipment on the CC configured as the Pcell, respectively, the control information can be transmitted in a manner of being contained in a data channel with a piggyback type.

To further achieve the aforementioned different technical task and in accordance with the purpose of the invention, as embodied and broadly described herein, according to one embodiment of the present invention, a user equipment for receiving a TDD (time division duplex) configuration information on a plurality of component carriers (CC) in a wireless communication system supporting a plurality of the CCs, the user equipments includes a receiver configured to receive information including at least one first CC index configured with an identical uplink-downlink configuration between a base station and the user equipment among a plurality of the CCs, wherein the identical uplink-downlink configuration is configured for a CC corresponding to a frequency band of the CC corresponding to the determined at least one first CC index among a plurality of the CCs configured to the user equipment, wherein the at least one first CC index corresponds to a CC index configured with a uplink-downlink configuration identical to a uplink-downlink configuration configured to at least one CC of a different base station, and wherein the at least one CC of the different base station configured with the uplink-downlink configuration identical to the uplink-downlink configuration configured to the CC corresponding to the at least one first CC index corresponds to the CC configured on the frequency band.

The receiver may receive control information from the base station on the CC corresponding to the frequency band of the CC corresponding to the determined at least one first CC index among a plurality of the CCs configured to the user equipment.

The CC, which corresponds to the at least one first CC index configured with the uplink-downlink configuration identical to the uplink-downlink configuration configured to the base station, among a plurality of the CCs configured to the user equipment can include a secondary cell (Scell). If a primary cell (Pcell) is not configured to the CC corresponding to the at least one first CC index configured with the uplink-downlink configuration identical to the uplink-downlink configuration configured to the base station among a plurality of the CCs configured to the user equipment, the receiver can receive a control information from the base station on the CC configured as the Pcell among the CC corresponding to the at least one first CC index or the CC configured to the user equipment. In this case, if the control information is received on the CC configured as the Pcell, the control information can be received in a manner of being contained in a data channel with a piggyback type.

Advantageous Effects

According to various embodiments of the present invention, TDD interference can be eliminated or reduced in a CA situation, thereby enhancing a communication performance.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 (b) is a diagram of a frame structure type 2 used in 3GPP LTE system as one example of a mobile communication system;

FIG. 3 (a) and FIG. 3 (b) is a diagram for structures of downlink and uplink subframes in 3GPP LTE system as one example of a mobile communication system;

FIG. 5 is a diagram for a configuration of a physical layer (first layer, L1) and a MAC layer (second layer, L2) in a multi carrier supportive of system;

BEST MODE

Mode for Invention

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. Detailed description disclosed together with the accompanying drawings is intended to explain not a unique embodiment of the present invention but an exemplary embodiment of the present invention. For instance, although the following descriptions are made in detail on the assumption that a mobile communication system includes 3GPP LTE and LTE-A system, they are applicable to other random mobile communication systems except unique features of 3 GPP LTE and LTE-A system.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS), a machine to machine (M2M) device, and the like. And, assume that a base station is a common name of such a random node of a network stage communicating with a terminal as a Node B, an eNode B, a base station (BS), an access point (AP) and the like. In the present specification, a base station can be used as a concept for including a cell, a sector, and the like.

In a mobile communication system, a user equipment may be able to receive information in downlink from a base station and transmit information in uplink to the base station. The informations transmitted or received by the user equipment may include data and various control informations. And, various kinds of physical channels may exist in accordance with types and usages of the informations transmitted or received by the user equipment.

For clarity, the present invention is described centering on 3GPP LTE/LTE-A, by which the technical idea of the present invention may be non-limited to this. Specific terminologies used in the following description are provided to help understand the present invention. The use of the specific terminology can be modified into a different form in a range of not deviating from the technical idea of the present invention.

Figure 1:
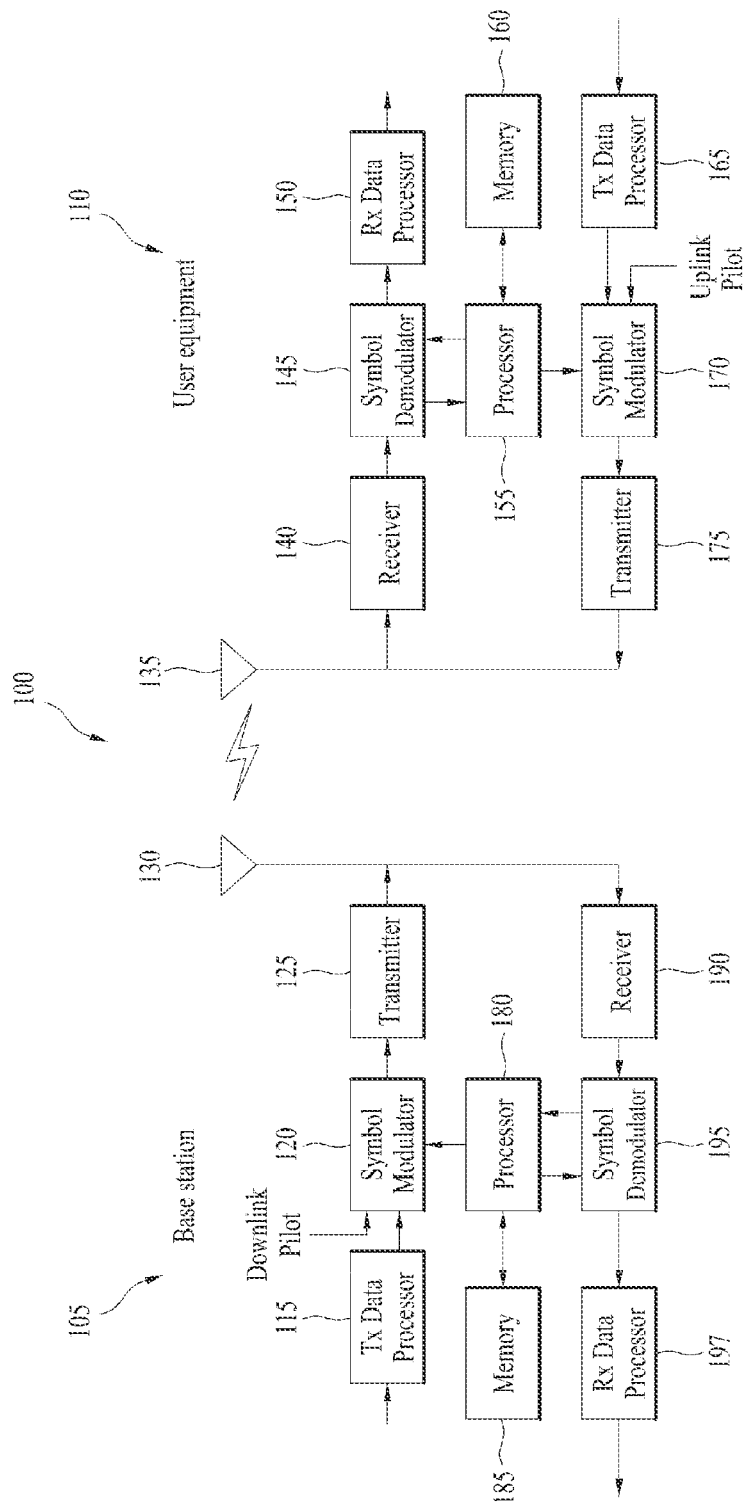
FIG. 1 is a block diagram for a configuration of a base station 105 and a user equipment 110 in a wireless communication system 100.

FIG. 1 is a block diagram for a configuration of a base station 105 and a user equipment 110 in a wireless communication system 100.

Although one base station 105 and one user equipment 110 are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 according to the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, performs coding on the received traffic data by formatting, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero (i.e., null). In each of symbol durations, pilot symbols may be contiguously transmitted. In doing so, the pilot symbols may include symbols of frequency division multiplexing (FDM), orthogonal frequency division multiplexing (OFDM), time division multiplexing (TDM), or code division multiplexing (CDM).

The transmitter 125 receives the stream of the symbols, converts the received stream to at least one or more analog signals, additionally adjusts the analog signals (e.g., amplification, filtering, frequency upconverting, etc.), and then generates a downlink signal suitable for a transmission on a radio channel. Subsequently, the downlink signal is transmitted to the user equipment via the transmitting antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, obtains data symbol estimated values (i.e., estimated values of the transmitted data symbols) by performing data modulation on the received data symbols, and then provides the data symbol estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

Regarding the user equipment 110 in uplink, the transmitted data processor 165 provides data symbols by processing the traffic data. The symbol modulator 170 provides a stream of symbols to the transmitter 175 by receiving the data symbols, multiplexing the received data symbols, and then performing modulation on the multiplexed symbols. The transmitter 175 generates an uplink signal by receiving the stream of the symbols and then, processing the received stream. The generated uplink signal is then transmitted to the base station 105 via the transmitting antenna 135.

In the base station 105, the uplink signal is received from the user equipment 110 via the receiving antenna 130. The receiver 190 obtains samples by processing the received uplink signal. Subsequently, the symbol demodulator 195 provides pilot symbols received in uplink and a data symbol estimated value by processing the obtained samples. The received data processor 197 reconstructs the traffic data transmitted from the user equipment 110 by processing the data symbol estimated value.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with one of ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment and a base station may be classified into $1^{st}$ layer (L1), $2^{nd}$ layer (L2) and $3^{rd}$ layer (L3) based on 3 lower layers of OSI (open system interconnection) model well known to communication systems. A physical layer belongs to the $1^{st}$ layer and provides an information transfer service via a physical channel. RRC (radio resource control) layer belongs to the $3^{rd}$ layer and provides control radio resources between UE and network. A user equipment and a base station may be able to exchange RRC messages with each other via a radio communication network using RRC layers.

Figure 2:
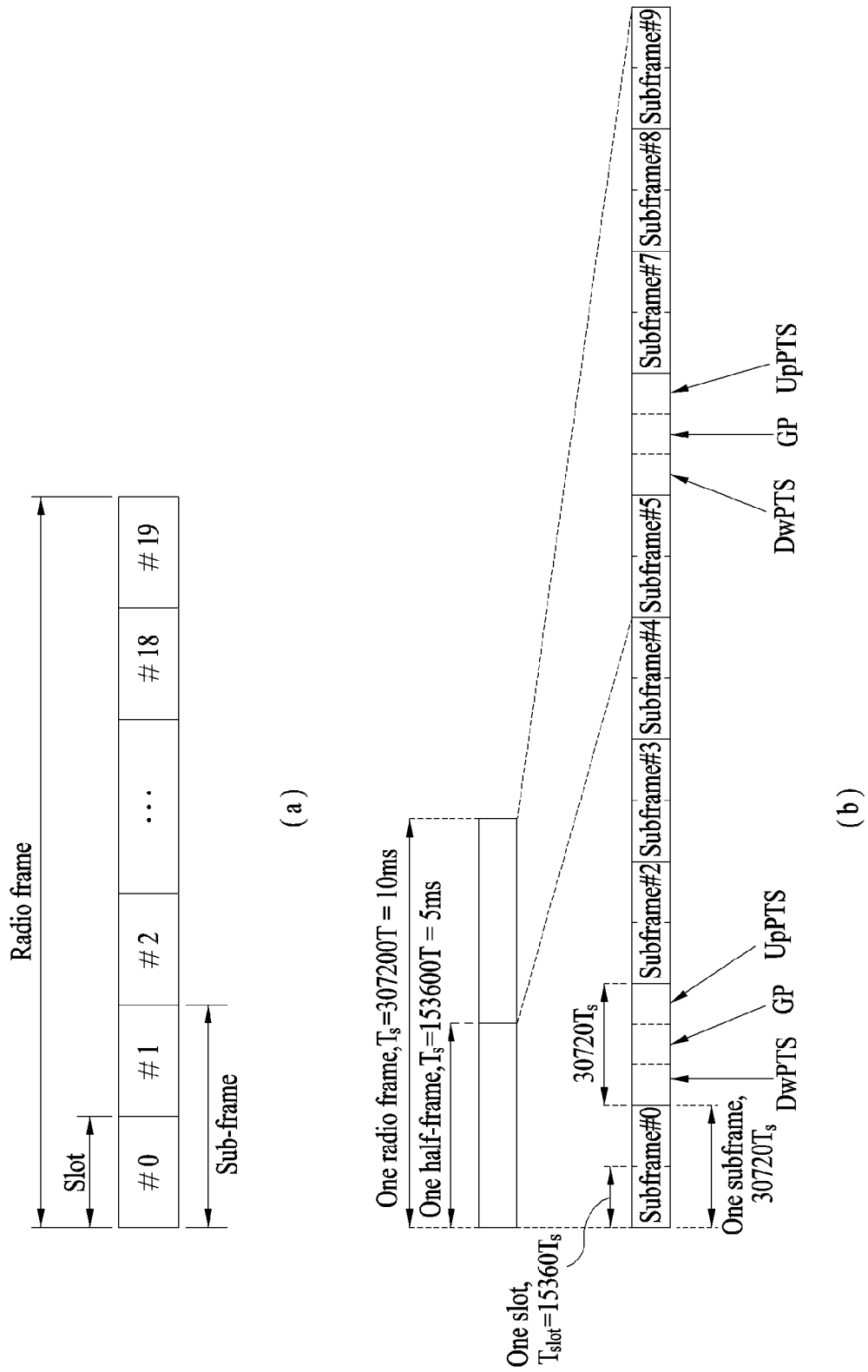
FIG. 2 (a) is a diagram for one example of a radio frame structure used in 3GPP LTE system as one example of a mobile communication system.

FIG. 2 (*a*) is a diagram for one example of a radio frame structure used in 3 GPP LTE system as one example of a mobile communication system.

Referring to FIG. 2 (*a*), one radio frame has a length of 10 ms ($327,200 \times T_s$) and is constructed with 10 subframes in equal size. Each of the subframes has a length of 1 ms and is constructed with two slots. Each of the slots has a length of 0.5 ms ($15,360 \times T_s$). In this case, $T_s$ indicates a sampling time and is represented as $T_s=1/(15 \text{ kHz} \times 2048)=3.2552 \times 10^{-8}$ (i.e., about 33 ns). The slot includes a plurality of OFDM symbols in a time domain and also includes a plurality of resource blocks (RBs) in a frequency domain.

In the LTE system, one resource block (RB) includes '12 subcarriers×7 (6) OFDM symbols' or SC-FDMA (single carrier-frequency division multiple access) symbol. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols or SC-FDMA symbols included in a slot may be modified in various ways.

FIG. 2 (*b*) is a diagram of a frame structure type 2 used in 3GPP LTE system as one example of a mobile communication system.

Referring to FIG. 2 (*b*), the frame structure type 2 is applicable to the TDD system. As described in FIG. 2 (*a*), one radio frame has a length of 10 ms ($327,200 \times T_s$) and is constructed with 10 subframes in equal size. Each of the subframes has a length of 1 ms and is constructed with two slots. Each of the slots has a length of 0.5 ms (15,360×$T_s$). In this case, $T_s$ indicates a sampling time and is represented as $T_s$=1/(15 kHz×2048)=3.2552×$10^{-8}$ (i.e., about 33 ns).

Each of the half-frames is constructed with 5 subframes. In each subframe of a radio frame, 'D' indicates a subframe for DL transmission, 'U' indicates a subframe for UL transmission, and 'S' indicates a special subframe constructed with 3 kinds of fields including DwPTS (downlink pilot time slot), GP (guard period) and UpPTS (uplink pilot time slot). The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink.

In case of the 5 ms DL-UL switch-point periodicity, a special subframe (S) exists in every half-frame. In case of the 10 ms DL-UL switch-point periodicity, a special subframe (S) exists in a $1^{st}$ half-frame only. In all configurations, $0^{th}$ subframe, $5^{th}$ subframe and DwPTS are the intervals provided for the DL transmission only. UpPTS and a subframe directly contiguous with a special subframe are the intervals for the UL transmission. In case that multi-cells are aggregated, it can be assumed that a user equipment has an identical UL-DL configuration for all cells and a guard period of a special subframe in a cell different from each other is overlapped at least 1456 $T_s$. The above-described structures of the radio frame are exemplary only. And, the number of subframes included in a radio frame, the number of slots included in the subframe and the number of symbols included in the slot may be modified in various ways.

Table 1 shows lengths of DwPTS, guard period and UpPTS in a special subframe.

TABLE 1

|  | Normal cyclic prefix in downlink | | | Extended cyclic prefix in downlink | | |
| --- | --- | --- | --- | --- | --- | --- |
|  |  | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Table 2 shows UL-DL configuration.

TABLE 2

| Uplink-downlink configuration | Downlink-to-Uplink Switch-point periodicity | Subframe number | | | | | | | | | |
| --- | --- | --- | --- | --- | --- | --- | --- | --- | --- | --- | --- |
|  |  | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 2, UL-DL configurations may be classified into 7 types in the frame structure type 2 in 3GPP LTE system. And, the respective configurations differ from each other in the positions or number of DL subframes, special frames and UL subframes. In the following description, various embodiments of the present invention will be described based on the UL-DL configuration of the frame structure type 2 shown in Table 2.

FIG. 3 (a) and FIG. 3 (b) is a diagram for structures of downlink and uplink subframes in 3GPP LTE system as one example of a mobile communication system.

Referring to FIG. 3 (a), one DL subframe includes 2 slots in time domain. Maximum 3 OFDM symbols in the first slot within the DL subframe correspond to a control region to which control channels are assigned and the rest of OFDM symbols correspond to a data region to which PDSCH (physical downlink shared channel) is assigned.

DL control channels used in 3GPP LTE system and the like include PCFICH (physical control format indicator channel), PDCCH (physical downlink control channel), PHICH (physical hybrid-ARQ indicator channel), and the like. The PCFICH transmitted in a first OFDM symbol of a subframe carries information on the number of OFDM symbols (i.e., a size of the control region) used for the transmission of control channels within the subframe. The control information transmitted on the PDCCH is called downlink control information (hereinafter abbreviated DCI). The DCI indicates UL resource allocation information, DL resource allocation information, a UL transmit power control command for random user equipment groups, and the like. The PHICH carries ACK/NACK (Acknowledgement/Negative acknowledgement) signal for UL HARQ (hybrid automatic repeat request). In particular, the ACK/NACK signal for UL data transmitted by a user equipment is transmitted on the PHICH.

In the following description, PDCCH, which is a physical channel, is described.

A base station can transmit resource allocation and transmission format (or called a DL grant) of PDSCH, resource allocation information (or called a UL grant) of PUSCH, a set of transmission power control (TPC) commands for individual user equipments within a random user equipment (UE) group, activation of VoIP (voice over IP), and the like on PDCCH. The base station can transmit a plurality of PDCCHs in a control region and a user equipment is able to monitor a plurality of the PDCCHs. PDCCH is configured with the aggregation of at least one or more contiguous CCEs (control channel elements). The PDCCH configured with the aggregation of the at least one or more contiguous CCEs undergoes subblock interleaving and may be then transmitted via the control region by the base station. CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs.

Control information carried on PDCCH by the base station may be called downlink control information (hereinafter abbreviated DCI). The base station can transmit the control information carried on the PDCCH according to DCI formats shown in Table 3.

TABLE 3

| DCI Format | Description |
|---|---|
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

Referring to Table 3, a DCI format 0 indicates UL resource allocation information, DCI format 1~2 indicate DL resource allocation information, DCI format 3, 3A include TPC commands for a plurality of UEs. In case of the DCI format 3/3A, the base station masks a TPC-ID on a CRC. The TPC-ID is an identifier for demasking in order for a UE to monitor PDCCH carrying a TPC command. The TPC-ID may correspond to an identifier used for the UE to decode the PDCCH to check whether the TPC command is transmitted on the PDCCH. The TPC-ID can be defined by reusing such conventional identifiers as C-RNTI (cell-radio network temporary identifier), PI-RNTI (paging indication-radio network temporary identifier), SC-RNTI (system change-radio network temporary identifier), and RA-RNTI (random access radio network temporary identifier) or can be defined by a new identifier. The C-RNTI is an identifier configured for a specific UE. Yet, the TPC-ID is an identifier configured for UEs of a specific set in a cell. The PI-RNTI, the SC-RNTI, and the RA-RNTI are identifiers configured for all UEs in a cell. In case that a DCI includes a TPC command for N number of UE, the N number of UE may receive the TPC command only. If TPC commands for all UEs within a cell are included in the DCI, the TPC-ID becomes an identifier for all UEs within the cell.

A UE searches for a TPC-ID in a manner of monitoring a set of PDCCH candidates in a search space in a subframe. In this case, the TPC-ID can be searched in a public search space or in a UE-specific search space. The public search space is a search space used by all UEs in a cell and the UE-specific search space is a search space used by a specific UE. If a CRC error is not detected by demasking the TPC-ID on a corresponding PDCCH candidate, a UE can receive a TPC command on the PDCCH.

The TPC-ID configured for PDCCH carrying a plurality of TPC commands only is defined. If the TPC-ID is detected, a UE receives a TPC command on a corresponding PDCCH. The TPC command is used to control a transmit power of an UL channel. Hence, transmission failure or interference to a different UE resulted from a wrong power control can be avoided by the TPC command.

In the following description, a method of mapping a resource for a base station to transmit PDCCH in LTE system is briefly described.

In general, a base station can transmit scheduling assignment information and different control information on PDCCH. A physical control channel can be transmitted by an aggregation or a plurality of contiguous control channel elements (CCE). One CCE includes 9 REGs (resource element groups). The number of REG not assigned to PCFICH (Physical Control Format Indicator Channel) or PHICH (Physical hybrid automatic repeat request indicator Channel) corresponds to $N_{REG}$. The number of CCEs available for a system is 0 to '$N_{CCE}-1$' (in this case, '$N_{CCE}=\lfloor N_{REG}/9 \rfloor$'). As depicted in Table 4, PDCCH supports multiple formats. One PDCCH configured with n number of contiguous CCEs starts with the CCE that satisfies the equation 'i mod n=0'. Multiple PDCCHs can be transmitted in one subframe.

TABLE 4

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Referring to Table 4, a base station can determine a PDCCH format depending on the number of region to which control information and the like are transmitted. A UE can reduce an overhead in a manner of reading the control information and the like by a CCE unit.

Referring to FIG. 3 (b), a UL subframe may be divided into a control region and a data region in frequency domain. A physical UL control channel (PUCCH), which carries UL control information, is allocated to the control region. And, a physical UL shared channel (PUSCH), which carries user data, is allocated to the data region. In order to maintain single carrier property, one user equipment does not transmit PUCCH and PUSCH simultaneously. A resource block pair (RB pair) in subframe is allocated to PUCCH for one user equipment. Resource blocks belonging to the resource block (RB) pair may occupy different subcarriers in each of 2 slots. Namely, a resource block pair allocated to PUCCH is frequency-hopped on a slot boundary.

Figure 4:
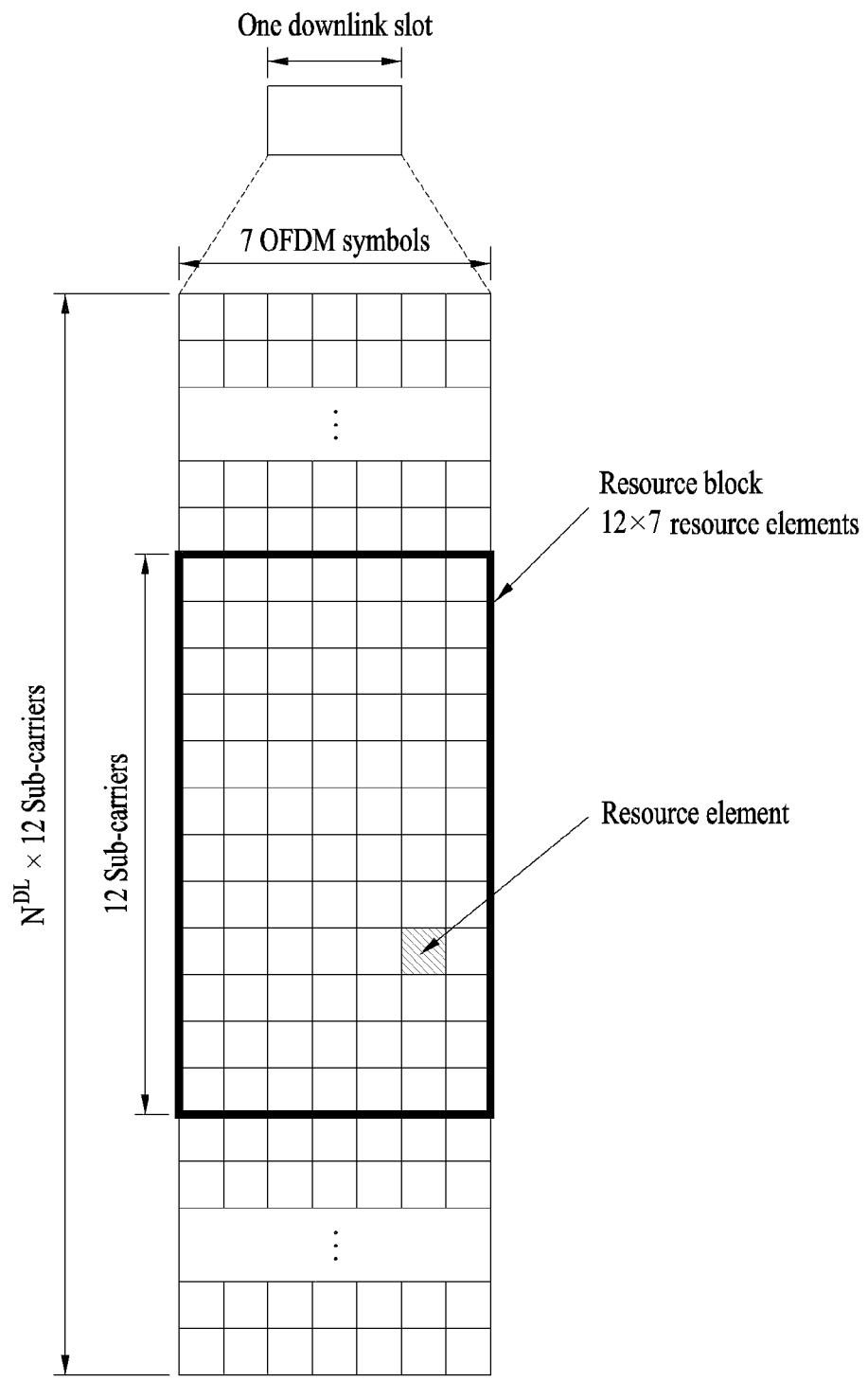
FIG. 4 is a diagram of a frequency-time resource grid structure of downlink in 3GPP LTE system.

FIG. 4 is a diagram of a frequency-time resource grid structure of downlink in 3 GPP LTE system.

A DL signal transmitted in each slot uses a resource grid structure constructed with $N^{DL}_{RB} * N^{RB}_{SC}$ subcarriers and $N^{DL}_{symb}$ OFDM (Orthogonal Frequency Division Multiplexing) symbols. In this case, '$N^{DL}_{RB}$' indicates the number of resource blocks (RBs) in DL, '$N^{RB}_{SC}$' indicates the number of subcarriers constructing one RB, and '$N^{DL}_{symb}$' indicates the number of OFDM symbols in one DL slot. A size of '$N^{DL}_{RB}$' varies in accordance with a DL transmission bandwidth configured within a cell and should meet '$N^{min,DL}_{RB} \leq N^{DL}_{RB} \leq N^{max,DL}_{RB}$'. In this case, '$N^{min,DL}_{RB}$' is a smallest DL bandwidth supported by a wireless communication system and '$N^{max,DL}_{RB}$' is a greatest DL bandwidth supported by the wireless communication system. It may become '$N^{min,DL}_{RB}=6$' and '$N^{max,DL}_{RB}=110$', by which the present example is non-limited. The number of the OFDM symbols included in one slot can vary in accordance with a length of a CP (cyclic prefix) and an interval of subcarrier. In case of multi-antennal transmission, one resource grid can be defined for each antenna port.

Each element within the resource grid for each antenna port is called a resource element (hereinafter abbreviated RE) and is uniquely identified by an index pair (k, l) within a slot. In this case, 'k' is an index in a frequency domain and 'l' is an index in a time domain. The 'k' has a value selected from '$0, \ldots, N^{DL}_{RB}N^{RB}_{SC}-1$' and the 'l' has a value selected from '$0, \ldots, N^{DL}_{symb}-1$'.

The resource block shown in FIG. 4 is used to describe the mapping relation between a prescribed physical channel and resource elements. Resource blocks can be classified into physical resource blocks (PRBs) and virtual resource blocks (VRBs). One PRB can be defined by $N^{DL}_{symb}$ contiguous OFDM symbols in time domain and $N^{RB}_{SC}$ contiguous subcarriers in frequency domain. In this case, '$N^{DL}_{symb}$' and '$N^{RB}_{SC}$' can be given as shown in Table 5. Hence, one PRB is constructed with '$N^{DL}_{symb} \times N^{RB}_{SC}$' resource elements. One PRB corresponds to one slot in time domain and also corresponds to 180 kHz in frequency domain, by which the present example is non-limited.

TABLE 5

| Configuration | | $N^{RB}_{sc}$ | $N^{DL}_{symb}$ |
|---|---|---|---|
| Normal cyclic prefix | Δf = 15 kH | 12 | 7 |
| Extended cyclic prefix | Δf = 15 kH | | 6 |
| | Δf = 7.5 kH | 24 | 3 |

PRB has a value ranging 0 to '$N^{DL}_{RB}-1$' in frequency domain. The relation between the PRB number ($n_{pRB}$) in frequency domain and the resource element (k, l) in one slot satisfies $$n_{PRB} = \left\lfloor \frac{k}{N^{RB}_{sc}} \right\rfloor.$$

In this case, a size of the VRB is equal to that of PRB. The VRB can be defined in a manner of being categorized into a localized VRB (hereinafter abbreviated LVRB) and a distributed VRB (hereinafter abbreviated DVRB). For the VRB of each type, a single VRB number '$n_{VRB}$' is allocated to a pair of VRBs in two slots within one subframe.

The VRB may have a size equal to that of the PRB. VRBs of two types may be defined as follows. First of all, the first type is the localized VRB (LVRB). And, the second type is the distributed VRB (DVRB). For the VRB of each of the types, a pair of VRBs is allocated across two slots of one subframe with a single VRB index (hereinafter named a VRB number). In particular, one index selected from the group consisting of 0 to '$N^{DL}_{RB}-1$' is allocated to $N^{DL}_{RB}$ VRBs belonging to a first one of the two slots constructing one subframe. And, one index selected from the group consisting of 0 to '$N^{DL}_{RB}-1$' is allocated to $N^{DL}_{RB}$ VRBs belonging to a second one of the two slots constructing one subframe as well.

In the following description, a process for a base station to send PDCCH to a user equipment in LTE system is explained.

First of all, a base station determines a PDCCH format in accordance with a DCI (downlink control information) which is to be sent to a user equipment and then attaches a CRC (cyclic redundancy check) to a control information. In this case, the CRC is masked with a unique identifier, which will be called a radio network temporary identifier (hereinafter abbreviated RNTI), in accordance with an owner or usage of PDCCH. If the PDCCH is provided for a specific user equipment, the CRC can be masked with a unique identifier of a user equipment, e.g., C-RNTI (cell-RNTI). If the PDCCH is provided to a paging message, the CRC can be masked with a paging indication identifier, e.g., P-RNTI (paging-RNTI). If the PDCCH is provided for system information, the CRC can be masked with a system information identifier, e.g., SI-RNTI (system information-RNTI). In order to indicate a random access response which is the response to a transmission of a random access preamble of a user equipment, the CRC can be masked with RA-RNTI (random access-RNTI). Table 6 shows examples of an identifier that masks PDCCH.

TABLE 6

| Type | Identifier | Description |
|---|---|---|
| UE-specific | C-RNTI | used for the UE corresponding to the C-RNTI. |
| Common | P-RNTI | used for paging message. |
| | SI-RNTI | used for system information (It could be differentiated according to the type of system information). |
| | RA-RNTI | used for random access response (It could be differentiated according to subframe or PRACH slot index for UE PRACH transmission). |
| | TPC-RNTI | used for uplink transmit power control command (It could be differentiated according to the index of UE TPC group). |

If C-RNTI is used, PDCCH carries a control information for a corresponding specific user equipment. If a different RNTI is used, PDCCH carries a shared control information received by all or a plurality of user equipments within a cell. The base station generates a coded data by performing a channel coding on the CRC attached DCI. The base station then performs a rate matching according to the number of CCEs allocated to the PDCCH format. Subsequently, the eNode B generates modulated symbols by modulating the coded data. Thereafter, the eNode B maps the modulated symbols to the physical resource elements.

Carrier Aggregation

3GPP (3$^{rd}$ generation partnership project) calls a next generation wireless communication system of LTE system as LTE-A (long term evolution-advanced) system and then designs the LTE-A system to enable to implement fast and mass data transmission. The LTE-A system adopts a carrier aggregation (CA) technology and then it makes a transmission bandwidth of a user equipment improve and efficiency of a frequency usage increase in a manner of aggregating a plurality of component carriers and then performing a transmission. The LTE-A system may be able to support up to maximum 100 MHz by making a bundle of a plurality of carriers (i.e., multi-carrier) instead of using a single carrier used in a conventional LTE Rel-8/9. In other word, the carrier supporting up to maximum 20 MHz in the conventional LTE Rel-8/9 is re-defined as a component carrier (CC) or a cell. One user equipment may be then able to use up to maximum 5 component carriers (CCs) via the carrier aggregation technology.

A current carrier aggregation (CA) technology is mainly equipped with characteristics as follows.

(1) The CA technology supports an aggregation of contiguous component carriers and the aggregation of discontinuous component carrier.

(2) The number of aggregation in UL and DL may be different from each other. If it is required to have a compatibility with a legacy system, the UL and the DL may consist of an identical number of component carrier.

(3) The CA technology configures a different number of component carriers for the DL/UL, respectively and may be then able to obtain a different transmission bandwidth.

(4) Each component carrier independently transmits a single transport block to a user equipment and is equipped with an independent hybrid automatic repeat request (HARQ) mechanism.

Unlike a legacy LTE system using a single carrier, the carrier aggregation using a plurality of component carriers needs a method of efficiently managing the component carriers. In order to efficiently manage the component carriers, the component carriers can be classified according to a role and property of the component carriers. The component carriers can be divided into a primary component carrier (PCC) and a secondary component carrier (SCC). The primary component carrier is the component carrier to be a center of managing the component carrier in case of using a plurality of component carriers. One primary component carrier is defined in each of user equipments. The primary component carrier (PCC) can be called a primary cell (Pcell) and the like.

Other component carriers except the one primary component carrier (PCC) are defined as a secondary component carrier (SCC). The secondary component carrier (SCC) can be called a secondary cell (Scell) and the like. The primary cell may play a role of a core carrier managing the whole cells, which are aggregated, and the secondary cell may play a role of providing an additional frequency resource to provide a higher transfer rate. For instance, a base station is able to perform an access (RRC) to signal a user equipment via the primary cell. Providing information for security and a higher layer can be performed via the primary cell as well. In practical, in case that there exists a single component carrier only, the single component carrier will become the primary component carrier. In this case, the component carrier may be able to play a role, which is identical to that of a carrier of a legacy LTE system.

In a carrier aggregation, a DL resource can be defined as a DL CC (component carrier) and a UL resource can be defined as a UL CC. And, a cell is defined as a combination of a pair of the DL resource and the UL resource. Yet, in case that the Dl CC and the UL CC are asymmetrically configured, the cell may indicate the DL CC (or UL CC) only. For instance, in case that a specific user equipment has one configured serving cell only, it may have one DL CC and one UL CC. Yet, in case that a specific user equipment has at least two configured serving cells, the number of DL CCs is equal to the number of the cells but the number of UL CCs may be equal to or smaller than the number of the cells. Or, in case that a specific user equipment has a plurality of configured serving cells, it may be able to support a carrier aggregation environment of which the number of UL CCs is greater than that of DL CCs.

A linkage between a carrier frequency (center frequency of a cell) of a DL resource and a carrier frequency of a UL resource may be indicated by a system information (SI) transmitted on the DL resource. For instance, by a linkage defined by SIB2 (system information block type 2), a combination of the DL resource and the UL resources can be configured.

According to the aforementioned definition, the carrier aggregation (CA) can be called an aggregation of two or more cells differing from each other in carrier frequency. In particular, in case that a specific UE is configured with two or more serving cells differing from each other in carrier frequency, it can be called a CA environment. By using at least one Scell (secondary cell) in a manner of being aggregated with Pcell (primary cell), enhanced bandwidth can be supported for the UEs supporting the CA.

In this case, PCell and SCell may be used as a serving cell. If a user equipment in RRC_CONNECTED state does not support a carrier aggregation, there exists only one serving cell including a PCell. On the other hand, if a user equipment in RRC_CONNECTED state supports the carrier aggregation, such a terminology as a serving cell indicates a set of one or more cells including the Pcell and the Scell.

The Pcell corresponds to a cell becoming a center of a control-related communication among the serving cells configured in the CA environment. A cell indicated or used in an initial connection establishment procedure or a connection re=establishment procedure may become a Pcell. A user equipment can receive important control information (e.g., PUCCH) via the Pcell of the user equipment and the user equipment can perform a monitoring procedure on system information acquisition and modification only in the Pcell. Yet, in some cases, the user equipment may receive the control information and the like via the Scell. A base station can change the Pcell only by a handover procedure using an RRCConnectionReconfiguration message including mobilityControlInfo.

Subsequently, the Scell means the rest of cells except the Pcell among the serving cells configured in the CA environment. PUCCH does not exist in the Scell. When an SCell is added, a base station may be able to provide all system information related to an operation of a corresponding cell in RRC_CONNECTED state to a user equipment supportive of a carrier aggregation environment via a dedicated signaling. For a Scell, change of system information can be performed by a release and addition of a corresponding Scell via one RRCConnectionReconfiguration message. The base station can transmit a dedicated signaling having a parameter different from a parameter included in a broadcast message in the corresponding Scell. After an initial security activating procedure has started, the base station may be able to configure at least one SCell in addition to the PCell (configured as a serving cell in the connection establishment procedure) for a UE. The Pcell is used to provide a security input and upper layer system information and the Scell provides an additional DL resource and can be used to provide an UL resource if necessary. The base station may independently add, delete, or modify the Scell via an RRC connection re-establishment procedure using the RRCConnectionReconfiguration message, which may or may not include the mobilityControlInfo.

For instance, in a carrier aggregation, multiple carriers can be classified into the Pcell and the Scell and this is a UE-specific parameter. A specific UE may have one or more configured serving cells. In case that there is a plurality of configured serving cells, one cell becomes a Pcell and the other cells become a Scell. In this case, the Pcell can be configured with a cell having a lowest index in a cell index (e.g., ServCellIndex). And, in case of a TDD, when a UE has a plurality of configured serving cells, an ACK/NACK for PDSCH transmitted in a specific DL subframe can be defined. An UL subframe in which the ACK/NACK is transmitted can be defined by an UL-DL configuration and the UL-DL configuration may be identical in all cells.

And, the UE can transmit such uplink control informations measured by one or more CCs as CSI (channel state information) (common name of CQI, RI, PMI, and the like), HARQ ACK/NACK, and the like to the base station on a predetermined CC. For instance, the UE collects (e.g., ACK/NACK multiplexing, ACK/NACK bundling, or the like) a plurality of ACK/NACK received from the Pcell DL CC and Scell(s) DL CC and may be then able to transmit a plurality of the ACK/NACK the on the UL CC in the Pcell using one PUCCH.

FIG. 5 is a diagram for a configuration of a physical layer (first layer, L1) and a MAC layer (second layer, L2) in a multi carrier supportive of system.

One physical layer (PHY) supporting one carrier exist in a base station of a legacy wireless communication system supporting a single carrier and one MAC (medium access control) entity for controlling one PHY entity can be provided. For instance, a base band processing operation can be performed in the PHY layer. For instance, L1/L2 scheduler operation including MAC PDU (protocol data unit) generation and MAC/RLC sub layer can be performed in a transmitting unit in the MAC layer. MAC PDU packet block of the MAC layer undergoes a logical transport layer and is converted to a transport block. The converted transport block is mapped to a physical layer input information block. The MAC layer depicted in FIG. 5 is represented as a whole L2 layer and is applicable as a meaning of including MAC/RLC/PDCP sub layers. It is apparent that this sort of application can be applied to all explanation on the MAC layer of the present invention in a manner of being replaced.

Meanwhile, a plurality of MAC-PHY entities can be provided in the system supporting multi carriers. In particular, as depicted in FIG. 5 (a), a transmitting unit and a receiving unit of the multi carrier supportive of system can be configured in a manner that each of n number of component carriers corresponds to each of a plurality of the MAC-PHY entities. Since an independent PHY layer and MAC layer are configured according to a component carrier, PDSCH is generated from the MAC PDU according to a component carrier in the physical layer.

Or, the multi carrier supportive of system can be configured with a common MAC entity and a plurality of PHY entities. In particular, as depicted in FIG. 5 (b), a transmitting unit and a receiving unit of the multi carrier supportive of system can be configured in a manner that n numbers of PHY entities corresponding to each of n number of component carriers are provided and a common MAC entity for controlling n number of the PHY entities exists. In this case, MAC PDU generated from the MAC layer can be divided into a plurality of transmission blocks corresponding to each of a plurality of the component carriers in the transmission layer. Or, when the MAC PDU is generated in the MAC layer or when an RLC PDU is generated in an RLC layer, the MAC PDU or the RLC PDU can be divided according to each of the component carriers. Hence, PDSCH is generated according to the component carrier in the physical layer.

Figure 6:
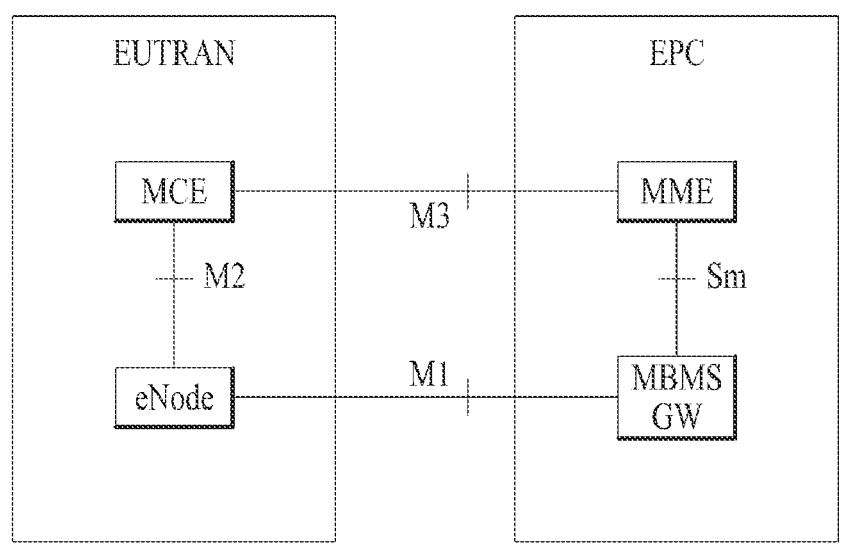
FIG. 6 is a diagram of a general structure of E-UTRAN MBMS.

FIG. 6 is a diagram of a general structure of E-UTRAN MBMS.

Referring to FIG. 6, E-UTRAN includes an MCE (multi-cell/multicast coordination entity) and a base station (eNode B). And, the MCE and the base station are connected to each other via an M2 interface. The M2 interface is a control plane interface in the E-UTRAN. EPC (evolved packet core) includes an MME and an MBMS GW (MBMS gateway). The MME and the MBMS GW are connected to each other via Sm interface. The MCE of the E-UTRAN and the MME of the EPC are connected to each other via an M3 interface. The base station (eNode B) of the E-UTRAN is connected to the MBMS GW of the EPC via an M1 interface. In this case, the M3 interface is a control plane interface between the E-UTRAN and the EPN, the M1 interface is a user plane interface. The MBMS GW can be connected to a plurality of base stations via the M1 interface to distribute a data and the MCE can be connected to a plurality of base stations via the M2 interface in an identical MBSFN for an MBMS session management signaling and a wireless configuration signaling.

Figure 7:
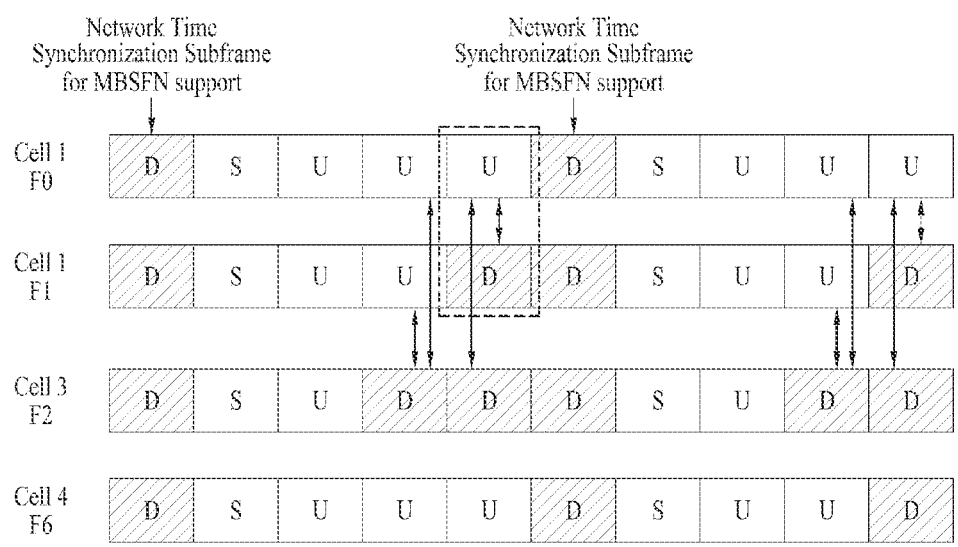
FIG. 7 is a diagram for explaining a contention (interference) model of a subframe level in a D-TDD system according to a DL/UL configuration in 3GPP LTE TDD depicted in Table 2.

FIG. 7 is a diagram for explaining a contention (interference) model of a subframe level in a D-TDD system according to a DL/UL configuration in 3GPP LTE TDD depicted in Table 2.

Referring to FIG. 7, assume that DL/UL configuration is different from each other according to each base station (cell). Although it is depicted that a base station 1 (cell 1) has a DL/UL configuration 0 in table 2, a base station 2 (cell 2) has a DL/UL configuration 1, a base station 3 (cell 3) has a DL/UL configuration 2, and a base station 4 (cell 4) has a DL/UL configuration 6, this is just exemplary.

In FIG. 7, the biggest interference model may correspond to a case that receiving performance of a UE in a cell of a DL transmission section is degraded by a UL transmit power of a UE in a cell of a UL transmission section. Moreover, if two UEs are situating at a cell boundary of each cell, more severe interference may occur. And, how many cells, which are adjacent to the cell of DL transmission section, have UL transmission section may have a strong influence on the receiving performance.

Besides an additionally occurring interference factor, there exists a coexistence problem with a heterogeneous TDD system. For instance, if a subframe is used in a manner of being assigned to a frequency domain adjacent to IEEE 802.16 system TDD or TD-SCDMA (H/LCR-TDD), additional interference may occur due to DL/UL timing dissonance. And, it may have a problem on DL subframe timing synchronization configured to support a MBSFN (multi-media broadcast over a single frequency network). Hence, it is necessary to have an approach to a MSAP (MCH (multicast channel) subframe allocation pattern).

Although a legacy TDD system has defined various numbers of DL subframe and numbers of UL subframe ratio (DL/UL ratio), it has maintained a TDD DL/UL configuration identical according to a carrier without considering a traffic load. There may exist a problem for the TDD DL/UL configuration identical according to a carrier to efficiently support the traffic load capable of being differently occurred according to a base station (e.g., a macro BS, a femto BS, a pico BS) or a UE.

In order to solve the aforementioned problem, a DL/UL configuration (e.g., TDD DL/UL ratio) different from each other according to a carrier can be used. Yet, in this case, co-channel interference and adjacent interference may have a bad influence on a mutual system. In a broad sense, a TDD interference problem on an individual CC may occur according to the corresponding CC in a CA (carrier aggregation) situation.

Hence, the present invention proposes a method of solving various factors capable of being occurred not in the system having an identical TDD configuration in the CA situation but in a situation of having a TDD DL/UL configuration different from each other according to individual CC.

First of all, in a TDD system supporting the CA, it is able to consider a method of supporting a DL/UL configuration (TDD DL/UL ratio) different from each other according to individual CC.

For instance, in a situation that there are 5 unpaired CCs, assume that one becomes a Pcell and the others become Scells. In this case, in terms of a base station, one fixed CC becomes the Pcell. On the contrary, in terms of a UE, one of the CCs may become the Pcell. In the former case, all UEs situating at an identical base station have the Pcell for an identical CC. In the latter case, one CC may become the Pcell according to UEs among the various CCs supported by the base station. This means that a CC different from each other may become the Pcell for the UEs situating at the identical base station.

In this case, in order to free from the interference capable of being occurred in case that CCs using an identical frequency band take a DL/UL ratio different from each other, all base stations can be configured to have an identical DL/UL ratio for a specific CC. The specific CC can be configured based on a CC index of a base station perspective or a CC index of a UE perspective. DL/UL synchronization, handover, UL control channel transmission, and the like can be performed based on a legacy Pcell.

A method of configuring a TDD DL/UL ratio different from each other according to an individual CC as follows.

There is a method of identically taking a DL/UL ratio, which is taken by a plurality of base stations from one CC among a plurality of CCs (of course, it is not limited to one CC, an identical DL/UL ratio can be configured from one or more CCs) and the other CCs can be configured by a DL/UL ratio different from each other. In this case, the method for the base station to select/determine one or more CCs, which are identically taking the DL/UL ratio among a plurality of the CCs, is described. As one example, in 3GPP LTE-A system, a Pcell is determined based on a UE-specific CC index. Hence, a CC index identical to each other or different from each other according to each UE based on a base station is used as the Pcell.

Figure 8:
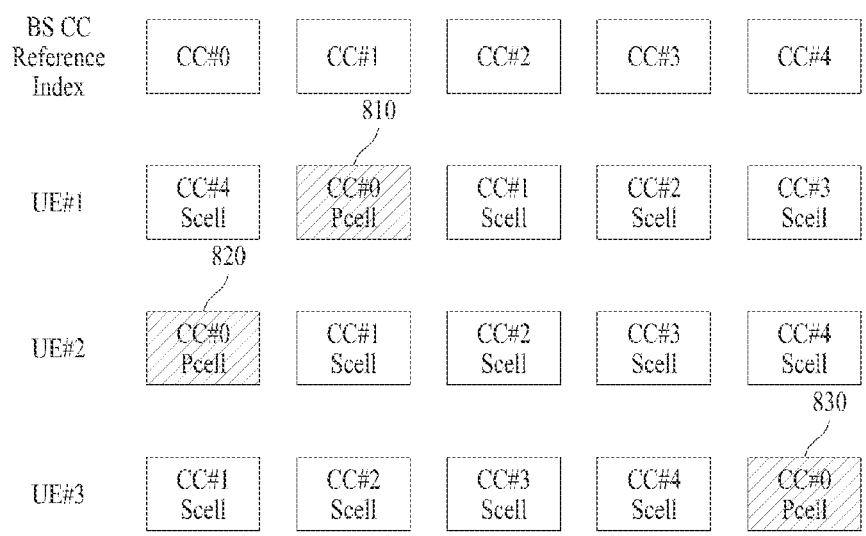
FIG. 8 is a diagram for one example of a UE-specific CC index mapping scheme.

FIG. 8 is a diagram for one example of a UE-specific CC index mapping scheme.

As depicted in FIG. 8, assume that there are 4 configured CCs and a base station indexed the 4 configured CCs as a CC 0 (or CC #0), a CC 1, a CC 2, and a CC 3. Although the number of the configured CCs may be identical to each other or different from each other according to UEs (a UE1, a UE 2, and a UE 3), assume that it is identical to each other in FIG. 8. Although the same numbers of CCs are used according to the UEs, it may be able to be configured with CCs different from each other. Although the CC index of a UE perspective is identical to each other but the CC index of a base station perspective may be different from each other.

Referring to FIG. 8, since the CC index is specifically determined according to the UEs, although the CCs are on an identical band, the CC index may have a difference between UEs or between the UE and the base station. For instance, the CC index can be UE-specifically configured for a CC configured as the CC 0 (CC #0) in the base station perspective and the CCs on an identical band. In particular, the UE 1 can be configured as a CC 4, the UE 2 can be configured as a CC 0, and the UE 3 can be configured as a CC 1, respectively. Although the CC index is UE-specifically determined, the base station can be configured to have the Pcell of CC index CC 0 (810, 820, 830) according to the UEs.

Figure 9:
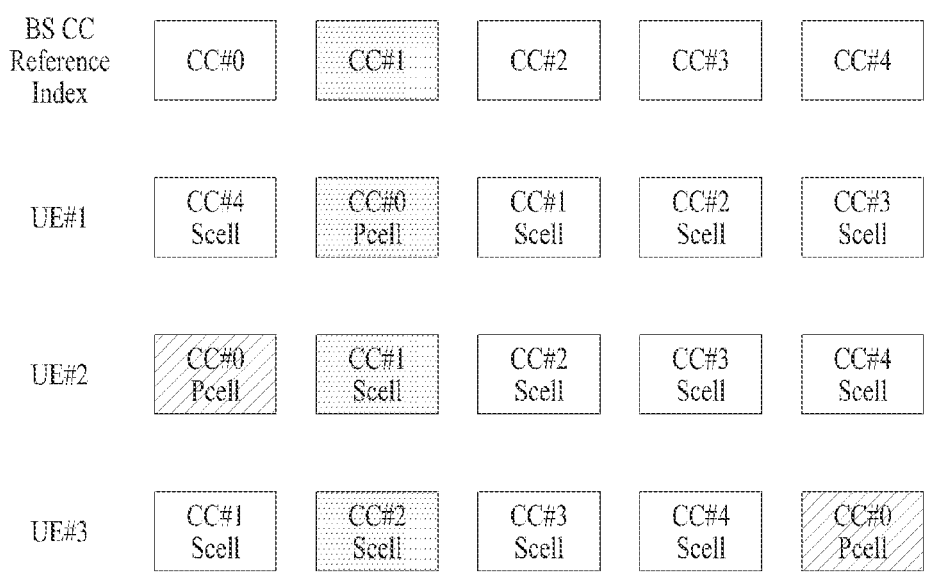
FIG. 9 is a diagram for one example of an identical DL/UL ratio configuration.

FIG. 9 is a diagram for one example of an identical DL/UL ratio configuration.

Based on the FIG. 8, in FIG. 9, the base station identically configures a TDD DL/UL ratio of the CC index according to each UE based on a center frequency of each CC (or, base station CC reference index, or an identical physical property according to each CC).

Referring to FIG. 9, for instance, the base station configures a CC reference index CC 1 (CC #1) as a common CC having an identical DL/UL ratio and a CC having a center frequency identical to that of the CC 1 can be configured as the common CC according to each UE. As depicted in FIG. 9, CC 0 of the UE 1, CC 1 of the UE 2, and CC 2 of the UE 3 can be configured as the common CC having an identical DL/UL ratio.

In case that the DL/UL ratio is differently configured according to each CC, a common CC having the identical DL/UL ratio between base stations can be configured as the Pcell. Yet, this is just exemplary. When the common CC is configured as the Pcell, the base station and the UE can transmit DL/UL control information on the common CC.

If there exists one Pcell only, lots of control informations are concentrated on the Pcell and it may cause a problem. Hence, the common CC can be configured with a plurality of CCs and the base station can UE-specifically configure the Pcell in a plurality of the CCs. In a legacy system, although UL control information is basically transmitted on the Pcell, as depicted in FIG. 9, since the common CC and the Pcell can be differently configured according to each UE, the UL control information can be transmitted on a Scell. For instance, for the UE 2, the common CC corresponds to the CC 1 and the CC configured as the Pcell corresponds to the CC 0. For the UE 3, the common CC corresponds to the CC 2 but the CC configured as the Pcell corresponds to the CC 0. Hence, the common CC and the Pcell can be differently configured.

As mentioned in the foregoing description, in case that the base station separately configures the Pcell and the common CC, it is able to configure the Pcell and the common CC to separately transmit control information. Or, it is able to configure that the control information can be transmitted only on the common CC. Or, the control information can be transmitted in a manner of being included in a data channel with a piggyback type in the Pcell and the control information can be transmitted on a control channel on the common CC.

As a method for a UE to perform a maximum power limitation handling in case of transmitting a UL control channel on one or more CCs, it is able to consider a method of configuring a priority (or a weighting) on the control channel of the Pcell and the control channel of the common CC. In general, an identical priority can be basically configured for the control channel of the Pcell and the control channel of the common CC. This method may become an element for controlling a total of the power calculated according to each CC not to exceed a total power level capable of being transmitted by the UE. In general, according to a related technology, the priority is given first to the control channel and then priority is given to a data channel.

Figure 10:
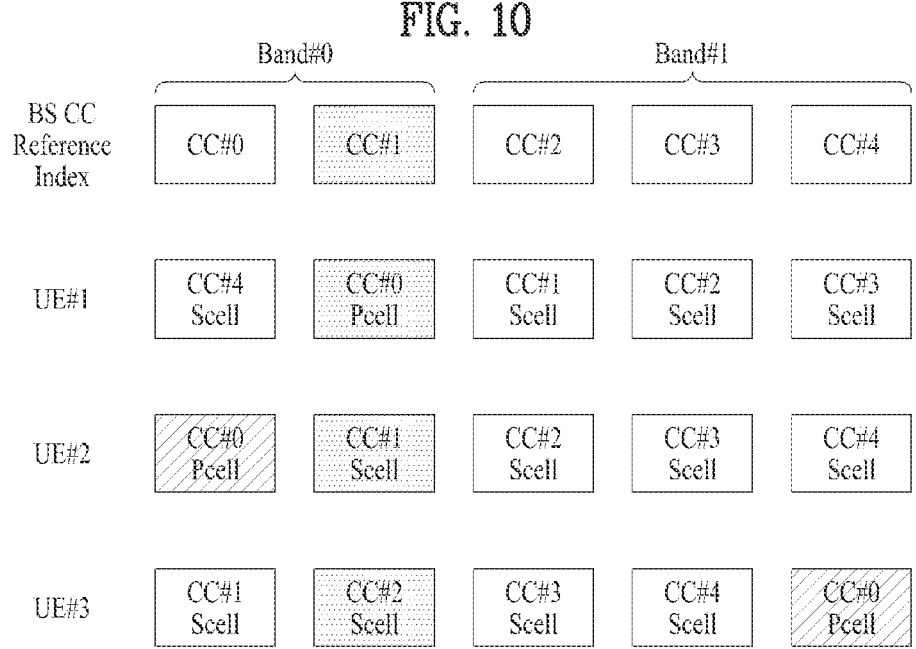
FIG. 10 is a diagram for one example of a CC index configuration.

FIG. 10 is a diagram for one example of a CC index configuration.

Based on the FIG. 8, in FIG. 10, assume that there are 4 configured CCs and the base station indexed the 4 configured CCs as a CC 0 (or CC #0), a CC 1, a CC 2, and a CC 3. The number of CCs configured according to UEs (a UE1, a UE 2, and a UE 3) may be identical to each other or different from each other. Although the same numbers of CCs are used according to the UEs, it may be able to be configured with CCs different from each other. Although the CC index of a UE perspective is identical to each other but the CC index of a base station perspective may be different from each other.

In case that a CC configuration configured as depicted in FIG. 9 is configured by a combination of inter-bands, common CCs are configured with only CCs situating on an identical band with a band unit or the common CCs can be configured to have a DL/UL ratio different from each other. FIG. 9 assume that the inter-bands (band 0 (e.g., 800 MHz) and a band 1 (e.g., 2 GHz)) are largely divided and the CCs are situating at an adjacent band on the identical band in frequency domain.

As depicted in FIG. 9, the common CC or the DL/UL ratio different from each other can be configured in the band 0 or the band 1 only on the basis of the CC reference index of the base station. It may limit the band 0 or the band 1 to configure the common CC or the DL/UL ratio different from each other to be identical or different according to a band unit.

As mentioned in the foregoing description, according to the embodiments of the present invention, the interference capable of being additionally occurred can be eliminated or reduced by configuring a dynamic TDD in a carrier aggregation situation. The contents described in the foregoing description can be applied to different various communication systems as well.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, a method of transmitting/receiving TDD configuration information on a plurality of component carriers, which is transmitted/received by a base station in a wireless communication system supporting a plurality of the component carries and an apparatus therefor are industrially available for various communication systems including 3GPP LTE, LTE-A, IEEE 802, and the like.

What is claimed is:

1. A method of transmitting a TDD (time division duplex) configuration information on a plurality of component carriers (CC) by a base station in a wireless communication system supporting a plurality of the CCs, the method comprising:
determining at least one first CC index to be configured with an uplink-downlink configuration, which is identical with a uplink-downlink configuration of at least one CC configured to a different base station, among a plurality of the CCs configured to the base station; and
configuring a CC corresponding to a frequency band of the determined at least one first CC index among a plurality of CCs configured to at least one user equipment with the uplink-downlink configuration,
wherein the CC corresponding to the determined at least one first CC index is a CC configured to an identical frequency band between the base station and the different base station.

2. The method of claim 1, further comprising:
transmitting information containing the at least one first CC index configured with the identical uplink-downlink configuration to the at least one user equipment, respectively.

3. The method of claim 1, wherein the identical uplink-downlink configuration is identical to a downlink subframe, a position or number of a special frame and an uplink subframe, or a ratio of the downlink subframe to the uplink subframe in a predefined plurality of uplink-downlink configurations.

4. The method of claim 1, wherein at least one CC index of a CC configured to a specific user equipment among the at least one user equipment, which corresponds to a frequency band of the determined at least one first CC index of the base station, is different from each other.

5. The method of claim 4, wherein at least one between the determined at least one first CC index of the base station and CC index configured to the at least one user equipment, which corresponds to frequency band of the determined at least one first CC index of the base station, is different from each other.

6. The method of claim 1, wherein the CC, which corresponds to the at least one first CC index configured with the uplink-downlink configuration identical to the uplink-downlink configuration of the base station, among a plurality of the CCs configured to the at least one user equipment comprises a primary cell (Pcell).

7. The method of claim 1, wherein the CC, which corresponds to the at least one first CC index configured with the uplink-downlink configuration identical to the uplink-downlink configuration of the base station, among a plurality of the CCs configured to the at least one user equipment comprises a secondary cell (Scell).

8. The method of claim 1, further comprising:
transmitting control information to the at least one user equipment on CC corresponding to the frequency band of CC corresponding to the determined at least one first CC index among a plurality of the CCs configured to the at least one user equipment, respectively.

9. The method of claim 7, further comprising transmitting control information to the at least one user equipment on the CC configured as the Pcell among the CC corresponding to the at least one first index or the CC configured to the at least one user equipment, respectively.

10. The method of claim 9, wherein the control information is transmitted in a manner of being contained in a data channel with a piggyback type.

* * * * *